March 26, 1968  C. H. SKINNER  3,374,806

SUBMARINE HOSE

Filed Feb. 10, 1965

INVENTOR.
CLAYTON H SKINNER
BY
John L. Shortley

United States Patent Office 3,374,806
Patented Mar. 26, 1968

3,374,806
SUBMARINE HOSE
Clayton H. Skinner, Buffalo, N.Y., assignor to
Hewitt-Robins Incorporated, Stamford, Conn.
Filed Feb. 10, 1965, Ser. No. 431,521
9 Claims. (Cl. 138—119)

ABSTRACT OF THE DISCLOSURE

A submersible hose having a steel, copper head or other heavy material fiber or threads incorporated longitudinally in the hose fabric or impregnating the hose fabric for ballast purposes. The ballasted portions of the hose are preferably separated by unballasted hose fabric to provide a hinge portion about which the hose may collapse for compact storage on a reel.

---

This invention relates to an improved submarine hose which can be coiled on a reel for ease in handling and storing.

Submarine hose according to this invention is utilized for transporting liquids across a body of water without interference from vessels, tides or storms, for example, from ship to shore and vice versa, as well as tank drainage hose. In either use, the hose must be heavier than the liquid it displaces whether empty or conducting a liquid so that it remains submerged, i.e., does not float or tend to float. Thus, if an air pocket is formed in a submarine hose so that a section of its rises, liquid traps are formed and the hose is unduly subject to stress. In tank drainage service, air trapped in the hose creates a bend which prevents complete drainage.

Known submarine hose has been ballasted in order to insure complete submergence by tieing weights to the exterior of the hose or running a cable through the hose interior. Weights tied to the hose become entangled and detached and, of course, a hose cannot be coiled on a reel with such ballasting. Cable ballasting reduces internal hose diameter, inhibits flow, and also precludes the use of a reel for handling the hose.

The primary object of this invention is to provide an improved submarine hose which overcomes the disadvantage noted above.

Another object of the invention is to provide a submarine hose which can be coiled on a reel for handling and storage.

Another object of the invention is to provide a submarine hose which is uniformly ballasted.

Briefly described, a submarine hose according to this invention comprises the usual tube or inner liner, a reinforcement of a hose fabric having incorporated therein a high specific gravity thread or fiber such as lead, copper, or steel wire utilized as a filler or the fabric warp and a protective cover. Also contemplated is a lead, copper or solder impregnated thread or fabric of cotton or a suitable synthetic material instead of wire as this term is usually understood.

The foregoing objects and advantages together with additional objects and advantages will become apparent from the following given in connection with the accompanying drawing, illustrating a presently preferred embodiment of the invention.

Figure 1:
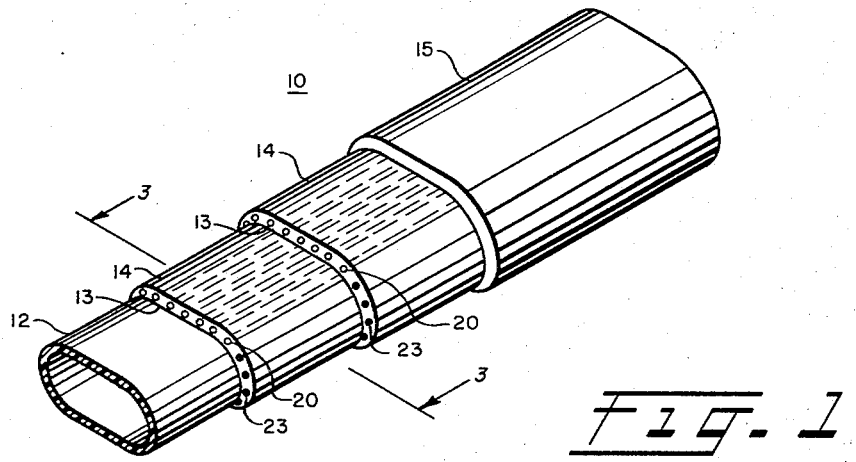
FIG. 1 is a schematic perspective view partly in section of a submarine hose according to the invention.

Referring to FIG. 1 a hose according to the invention is generally designated 10. The hose 10 is shown in FIG. 1 in a partially collapsed condition, for example, as it emerges from a reel (not shown). In service, the hose 10 would conform more nearly to a circle in cross section and may assume the shape shown also when empty and submerged. In general terms, the hose 10 comprises the usual liner 12, an inner fabric layer 14, an outer fabric layer 14, and a cover 15. The inner and outer fabric layers 14 may both be ballast fabric according to the invention as shown in FIG. 1, or one of them may be conventional hose fabric (not shown).

In FIG. 1 the hose 10 is shown schematically to simplify understanding the invention and is not intended as an actual illustration of a submarine hose limiting the hose construction according to the invention.

A submarine hose for conveying aviation gasoline would have an inner tube or liner 12 of known rubber composition. However, the liner 12 may be dispensed with for other applications. Between the liner 12 and the ballast fabric layer 14, a rubber skim 13 is employed for securing these layers together. A similar attachment is shown between the inner and outer ballast fabric layers 14.

Reference numeral 15 represents a hose cover of known material.

As seen in FIG. 1 each of the ballast fabric layers 14 include a weighted section containing ballast 20 and a non-weighted or hinge section in which ordinary textile warps 23 are utilized. A more detailed description of the ballast fabric 14 will be given in connection with the remaining figures of the drawing.

In the ballast fabric or layers 14 the ballast 20 extends in the length direction of hose as indicated by the dash lines in FIG. 1. Thus, the ballast fabric is uniformly weighted. The ballast 20 may be in the form of a wire of high specific gravity material such as a lead wire core covered with a wrap of cotton thread or lead and cotton threads twisted together. As indicated above, other possibilities and materials are contemplated to provide the ballast 20 for a ballast fabric 14.

Figure 2:
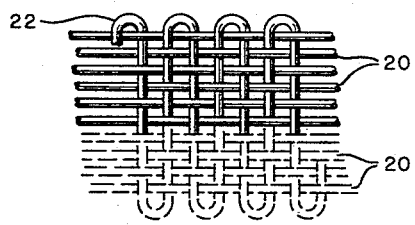
FIG. 2 is a plan view schematically illustrating a ballast fabric which could be incorporated in the hose of FIG. 1.
Figure 3:
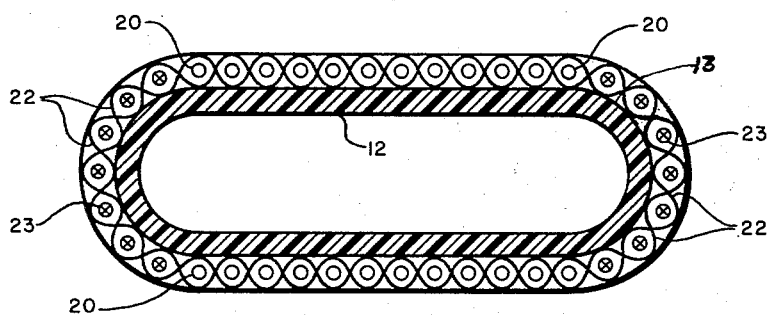
FIG. 3 is an enlarged schematic cross sectional view which may be considered as taken along line 3—3 in FIG. 1.

FIGS. 2 and 3 illustrate forms of a ballast fabric 14. In each of these figures the ballast 20 is represented as the warp of the fabric 14. A woof 22 of textile fiber, which may be cotton or a synthetic fiber such as nylon, rayon, Dacron, or any other suitable material, binds the ballast 20 together as is known from fabric weaving and manufacturing techniques. Of course, the invention is not necessarily limited to a woven ballast fabric.

As noted above, the ballast 20 extends in the direction of length of the hose 10 so that a fabric in which the warp is all ballast 20 (FIG. 2) will still be capable of collapsing and thus it can be wound upon a reel. However, for more efficient reeling, the warp of the submarine hose can be made only partly ballast so that a hinge portion is provided as shown in FIG. 3. In FIG. 3 representing a cross sectional schematic view of a submarine hose according to the invention, the warp of the fabric consists of ballast 20 and textile fillers 23. The portion of the hose containing the textile warp provides a hinged portion interconnecting each end of the rigid ballasted portions having the ballast warp 20. By virtue of this so-called hinged portion of the hose more efficient reeling is achieved, i.e., for a given length of hose the reel diameter is minimum. The pick of the woof 22 may be high or low depending on the strength desired as is known.

It should be noted that the ballast fabric according to this invention may be provided with ballast only in one section of the hose wall so that the ballast section becomes the bottom wall of the hose which could then be laid with a minimum of twisting.

It will be clear from the foregoing description of this invention that variations or modifications can be incorporated by those skilled in the art in a given situation without departing from the spirit of the above disclosure. Therefore, the foregoing is given by way of illustration and is not intended as a limitation of the scope of the subjoined claims.

I claim:
1. A collapsible submarine hose comprising a ballast fabric, said fabric having a warp arranged longitudinally of the hose, a substantial portion of the yarns of said warp having a high specific gravity, the remainder of the yarns of said warp having a lower specific gravity than said substantial portion of the yarns and being disposed in two diametrically opposite sections and being flexible in the order of ordinary textile warp so as to facilitate collapse of said hose by flexing of said opposite sections, the quantity of said warp yarns of a high specific gravity being such as to insure that the composite specific gravity of the hose and a fluid which it is designed to carry when the latter is contained therein will be greater than the specific gravity of the fluid in which the hose is intended to be immersed.
2. A submarine hose according to claim 1 wherein the warp of said portion comprises a metal wire.
3. A submarine hose according to claim 1 wherein the warp of said portion comprises a wire core thread overlaid with a textile fiber.
4. A submarine hose according to claim 1 wherein the warp of said portion comprises a wire thread twisted together with a textile fiber.
5. A submarine hose according to claim 1 with the addition of an inner tube, a first and second layer of said ballast fabric concentrically surrounding said inner tube; each said layer having the warp of said portion in overlying relation.
6. A submarine hose according to claim 1 wherein the warp of said portion comprises a textile fabric impregnated with metal.
7. A submarine hose according to claim 1 wherein said textile fabric is impregnated with metal.
8. A submarine hose according to claim 1 wherein the warp of said portion consists of alternate warps one of which consists of a material having a specific gravity on the order of metallic substances and the alternate warp consists of a material having a specific gravity on the order of textile fabric.
9. A submarine hose according to claim 1 wherein said alternate textile fiber consists of a synthetic polymer.

References Cited
UNITED STATES PATENTS

| | | | |
|---|---|---|---|
| 308,331 | 11/1884 | Teter | 138—124 |
| 359,222 | 3/1887 | Meacom | 138—127 |
| 1,158,995 | 11/1915 | Evans | 138—126 |
| 1,179,374 | 4/1916 | Many | 138—119 |
| 1,365,809 | 1/1921 | Atwood | 138—127 |
| 3,068,906 | 12/1962 | Rittenhouse | 138—126 |

LAVERNE D. GEIGER, *Primary Examiner.*

B. KILE, *Assistant Examiner.*